J. H. BROWN,

Assisnor to F. A. KURSHEEDT.

Machine for Creasing Fluted Fabrics.

No. 9,071. Reissued Feb. 10, 1880.

Witnesses;

Edward J. Blair.

J. Hindon Hyde

Inventor;

John H Brown

N. PETERS, PHOTO-LITHOGRAPHER, WASHINGTON, D. C.

2 Sheets—Sheet 2.

J. H. BROWN,

Assisnor to F. A. KURSHEEDT.

Machine for Creasing Fluted Fabrics.

No. 9,071. Reissued Feb. 10, 1880.

Witnesses:

Edward J. Blair.

J. Hindon Hyde

Inventor:

John H. Brown

N. PETERS, PHOTO-LITHOGRAPHER, WASHINGTON, D. C.

UNITED STATES PATENT OFFICE.

JOHN H. BROWN, OF NEW YORK, N. Y., ASSIGNOR TO FREDERIC A. KURSHEEDT.

MACHINE FOR CREASING FLUTED FABRICS.

SPECIFICATION forming part of Reissued Letters Patent No. 9,071, dated February 10, 1880.

Original No. 171,264, dated December 21, 1875. Application for Reissue filed December 10, 1879.

*To all whom it may concern:*

Be it known that I, JOHN H. BROWN, of New York city, New York, have invented certain new and useful Improvements in Machines for Pressing or Creasing Flutings, which improvements are fully set forth in the following specification, reference being had to the accompanying drawings.

In the method heretofore practiced for pressing or creasing flutings a narrow metallic edge is brought down upon the fluted fabric and there pressed until a crease is formed, which is usually retained in place by what is commonly called a "gum-cord"—that is, a cord or thread moistened with some adhesive substance. This method is slow, because the fluted fabric has to be moved along, space by space, under the pressing-iron as the operation is performed on each section of the length of the fluted fabric, and it is also defective because the flute which is crushed down will sometimes fall forward and sometimes backward, producing an irregular appearance in the goods. My machine greatly facilitates the operation, and at the same time produces a much more perfect result.

The characteristic features of my machine are a supporting-surface, over which the flutings are fed, combined with an endless rotating pressing-surface converging very gradually to the plane of the supporting-surface.

Figure 1:
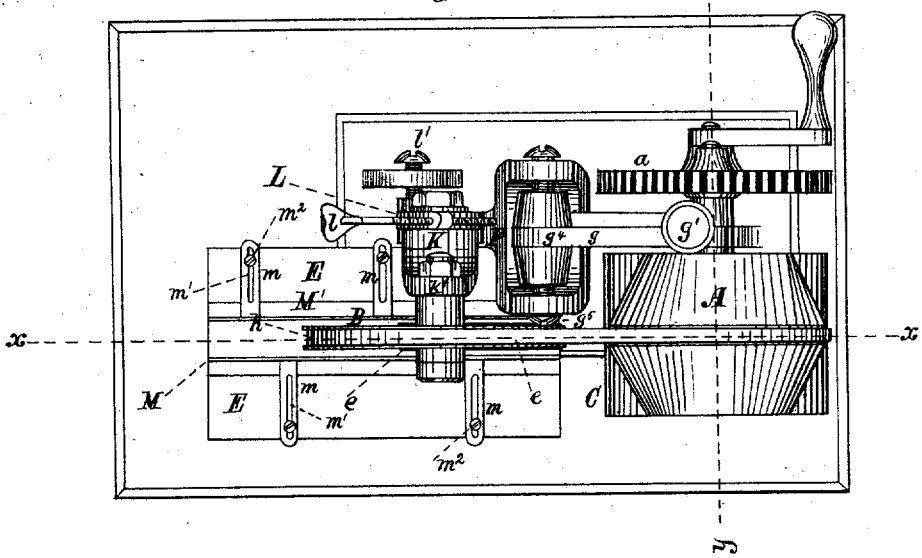
Figure 2:
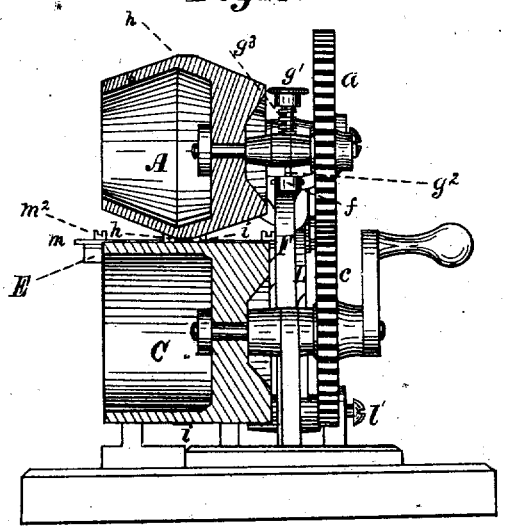
Figure 3:
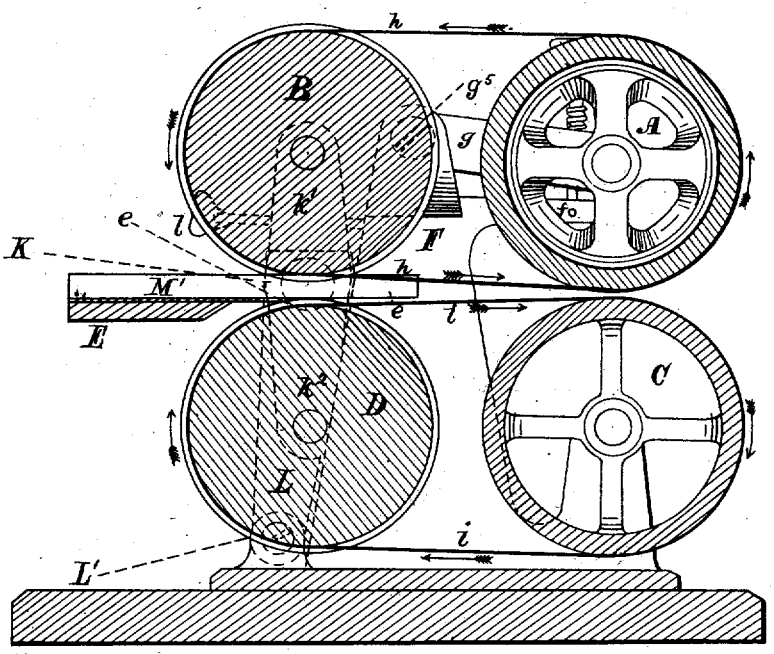

In the accompanying drawings, Figure 1 is a plan of my machine. Fig. 2 is a section in elevation at the line *y y*, showing also the gearing in elevation. Fig. 3 is a section at the line *x x*, Fig. 1.

The same letters refer to similar parts in all the drawings.

C is a hollow cylinder revolving upon an axis supported by a bearing in the frame of the machine. In the interior of this cylinder heat may be applied, either by a gas-jet or other appropriate means. A is a presser feeding-roller, having a cylindrical surface at *h*. The other portions are beveled off to permit portions of the fluted fabric to pass without being pressed. (See Figs. 1 and 2.) This roller may be made hollow, and may be heated by a gas-jet or other appropriate means. This roller is mounted upon a revolving shaft, which is driven by a gear-wheel, *a*, from a corresponding gear-wheel, *c*, on the shaft of the cylinder C. The shaft of the roller A is supported upon a lever, *g*, which vibrates around a center, $g^4$, so placed as to permit a slight nearly vertical movement to the roller A. Through this lever a set-screw, $g'$, passes, having a recoil-spring, $g^3$, between its head and the top of the lever, and being screwed into the frame of the machine at *f*. By turning down this set-screw this roller A will be pressed upon the cylinder C with greater force, and the spring will permit it to yield and rise slightly, as occasion may require.

D and B are two band-wheels mounted upon two centers, $k'$ and $k^2$. The object of these wheels is to cause the pressing-surface or band which they carry, and which is carried also by the pressing-rollers, to converge to the supporting-surface more gradually than it would if the presser-roller alone acted as such surface, unless such roller was of very large diameter. These two centers are fixed upon a vibrating beam, which is centered at K upon the lever L, which is centered also on the frame of the machine at L'. The upper end of this lever is provided with a screw, *l*, whose office is to tighten or loosen the bands which pass over the band-wheels by moving the lever L away from or toward the cylinder and presser-roller, as required. When this set-screw is tightened the beam which supports the two wheels B and D accommodates itself to the length of the bands and assumes the position which will make the tension equal upon both bands.

*i i* and *h h* are narrow bands which form the pressing-surfaces, preferably of metal. The band *h h* passes around the wheel B and the presser-roller A, and acts to gradually flatten and crease the fluted fabric between its surface and that of the band *i i*, which passes around the wheel D and the cylinder C, and acts to support the fabric against the pressure of the other band. The centers of the band-wheels B and D are farther apart than the centers of the cylinder C and presser-roller A, so that the bands converge as they approach the pressure-point between the cylinder C and the presser-roller A.

E is a table or supporting-surface for the fluting, on which the work is received, and which leads up to the machine, and its surface is about level with the top of the band-wheel D. After the goods are fed over this table they are supported by the lower band, *i*, and the cylinder C. On the top of the plate E are two parallel guides, M and M′, attached to bars *m*, in which are slots *m′*, through which pass the screw-pins $m^2$, by means of which the guides M M′ are held fast to the plate E, and by loosening the screws $m^2$ the guides M M′ can be moved backward or forward through the slots *m′* in the bars *m*.

The operation of the machine is as follows: It is set in motion by a crank or other means in the direction of the arrows in Fig. 3. A length of fluted fabric which it is desired to press or crease permanently is fed into the machine on the table E between the guides M M′, so that the central or other portion of the flutes can be very gradually pressed down by the converging pressing-surface, and finally flattened. The result is accomplished, because as the goods advance in the machine the flutes are pressed down almost vertically, so that they will be symmetrically and similarly laid, and as the presser-roller A presses down the folds upon the cylinder C they receive a permanent set or crease.

The guides M M′ serve not only to keep the fluted fabric in proper position while it is passing between the bands, but they also serve to hold back the fluted fabric and regulate to some extent the speed with which it passes between the cylinder C and the presser-roller A.

By proper mechanism, when desired, a gum-cord can also be fed under or above the fluted fabric, or both above and under the same, and between the cylinder C and the presser-roller A.

It is obvious that the mode of operation of this machine may be extended so as to have several pairs of bands moving in the same machine, each pair making a separate pressure or crease in the fluted fabric which is passing through the machine, intervals being left between the bands for the passage of the parts of the fluted fabric which are not to be pressed.

What I claim as my invention, and desire to secure by Letters Patent, in a machine for creasing fluted fabrics, is—

1. In a machine for feeding and creasing fluted fabrics, the combination, with a supporting-surface suitable for such fabrics, of an endless rotating pressing-surface slowly converging toward the supporting-surface, and adapted to flatten and crease one or more portions of the fluted fabric, leaving other portions unflattened, substantially as described.

2. The endless bands *h h* and *i i*, in combination with the presser-roller A and cylinder C and the wheels B and D, when constructed and arranged to operate substantially as and for the purpose set forth.

3. In a machine for creasing fluted fabric, the combination of the cylinder C with the presser-roller A, mounted upon a movable center and controlled by a spring, for the purpose of varying the pressure as desired, substantially as described.

4. The band-rollers B and D, mounted on opposite ends of a vibrating beam, for the purpose of equalizing the tension of the bands, substantially as described.

5. The band-wheels B and D, with the lever L and the screw *l*, combined and arranged substantially as described.

6. In a machine for creasing fluted fabric, the combination of the presser-wheels A and C, geared with the band-wheels B and D, substantially as described.

7. In a machine for creasing fluted fabric, the combination of the table E with the band-wheels B and D, substantially as described.

8. In a machine for creasing fluted fabric, the combination of the table E with the guides M M′, substantially as described.

JOHN H. BROWN.

Witnesses:
EDWARD J. BLAIR,
J. E. HINDON HYDE.